(12) United States Patent
Monereau et al.

(10) Patent No.: US 8,746,009 B2
(45) Date of Patent: Jun. 10, 2014

(54) PRODUCTION OF HYDROGEN FROM A REFORMING GAS AND SIMULTANEOUS CAPTURE OF CO2 CO-PRODUCT

(75) Inventors: Christian Monereau, Paris (FR); Céline Carriere, Levallois-Perret (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 286 days.

(21) Appl. No.: 13/130,541

(22) PCT Filed: Nov. 18, 2009

(86) PCT No.: PCT/FR2009/052210
§ 371 (c)(1),
(2), (4) Date: May 20, 2011

(87) PCT Pub. No.: WO2010/066972
PCT Pub. Date: Jun. 17, 2010

(65) Prior Publication Data
US 2011/0223100 A1    Sep. 15, 2011

(30) Foreign Application Priority Data

Dec. 11, 2008  (FR) ...................................... 08 58472

(51) Int. Cl.
*B01D 53/047* (2006.01)
*F25J 3/00* (2006.01)
*C01B 3/24* (2006.01)
*C01B 31/20* (2006.01)

(52) U.S. Cl.
USPC .............. 62/617; 95/96; 423/437.1; 423/650; 423/652

(58) Field of Classification Search
USPC .............. 423/648.1, 437.1, 650–654; 62/617; 95/96
See application file for complete search history.

(56) References Cited

U.S. PATENT DOCUMENTS 3,838,553 A * 10/1974 Doherty ............................ 95/98
4,772,420 A    9/1988 Pinto et al.
(Continued)

FOREIGN PATENT DOCUMENTS

FR    2 884 304    10/2006
JP    61-97124    5/1986
(Continued)

OTHER PUBLICATIONS

International Search Report for PCT/FR2009/052210, Mar. 30, 2010.
(Continued)

*Primary Examiner* — Wayne Langel
(74) *Attorney, Agent, or Firm* — Eldwood L. Haynes

(57) ABSTRACT

Process for producing hydrogen from a gas mixture comprising hydrogen, CO2, CO, CH4 and water, employing a CO2 PSA unit, a cryogenic unit and an H2 PSA unit, in which process: a) said gas mixture is introduced into the CO2 PSA unit, producing a CO2-enriched fraction and CO2-depleted fraction; b) CO2-enriched fraction is introduced into the cryogenic unit, producing a CO2-enriched fraction and an H2-enriched fraction; c) the H2-enriched fraction is recycled upstream of the H2 PSA unit; and d) the CO2-depleted fraction coming from step b) is introduced into the H2 PSA unit, producing a hydrogen-enriched stream and a waste gas.

13 Claims, 3 Drawing Sheets

(56) References Cited

U.S. PATENT DOCUMENTS

| | | | |
|---|---|---|---|
| 4,952,223 A * | 8/1990 | Kirshnamurthy et al. | 62/626 |
| 5,000,925 A * | 3/1991 | Krishnamurthy et al. | 48/61 |
| 5,026,406 A | 6/1991 | Kumar | |
| 5,714,132 A * | 2/1998 | Kapoor et al. | 423/418.2 |
| 7,309,378 B2 * | 12/2007 | Bancon et al. | 95/96 |
| 8,303,930 B2 * | 11/2012 | Chen et al. | 423/655 |
| 8,394,174 B2 * | 3/2013 | Chen et al. | 95/45 |
| 8,460,630 B2 * | 6/2013 | Niitsuma et al. | 423/437.1 |
| 2002/0073845 A1 * | 6/2002 | Reddy | 95/96 |
| 2004/0045434 A1 * | 3/2004 | Golden et al. | 95/96 |
| 2007/0227353 A1 | 10/2007 | Kumar | |
| 2007/0232706 A1 | 10/2007 | Shah et al. | |
| 2007/0264186 A1 * | 11/2007 | Dybkjaer et al. | 423/418.2 |
| 2009/0298957 A1 | 12/2009 | Gauthier et al. | |
| 2011/0011128 A1 * | 1/2011 | Grover | 62/617 |
| 2011/0223100 A1 * | 9/2011 | Monereau et al. | 423/648.1 |

FOREIGN PATENT DOCUMENTS

| | | |
|---|---|---|
| JP | 61-197403 | 9/1986 |
| JP | 05-065518 | 3/1993 |
| JP | 2004-519538 | 7/2004 |
| JP | 2008-179496 | 8/2008 |
| WO | WO 02/06084 | 9/2002 |
| WO | WO 2006 054008 | 5/2006 |

OTHER PUBLICATIONS

JP Patent Application No. 2011-540153, Sep. 3, 2013 Office Action.

* cited by examiner

PRODUCTION OF HYDROGEN FROM A REFORMING GAS AND SIMULTANEOUS CAPTURE OF CO2 CO-PRODUCT

This application is a 371 of International PCT Application PCT/FR2009/052210, filed Nov. 18, 2009, the entire contents of which are incorporated herein by reference.

FIELD OF THE INVENTION

The present invention relates to a hydrogen production process with capture of the $CO_2$ produced simultaneously.

BACKGROUND

Most hydrogen is supplied from steam reforming of hydrocarbons, more particularly methane (SMR). The reformed gas is generally sent to a shift reactor (water-gas shift reactor) to produce more hydrogen. The water-gas shift reaction is a reaction between carbon monoxide and water in order to form carbon dioxide and water.

The gas produced generally has the following characteristics:
 pressure from 15 to 40 bar abs;
 temperature close to the ambient temperature (after cooling);
 composition in mol %: between 60 and 80% $H_2$; between 15 and 25% $CO_2$; between 0.5 and 5% CO; between 3 and 7% $CH_4$; between 0 and 6% $N_2$, saturated with water;
 flow rate: from a few thousand to a few hundred thousand $Nm^3/h$.

Such a gas is then generally sent directly to a hydrogen PSA (Pressure Swing Adsorption) in order to produce high-purity hydrogen (99% to 99.9999 mol %).

The waste from the PSA contains all the $CO_2$, the great majority of the $CH_4$ and CO, a large portion of the $N_2$ and the hydrogen in an amount that depends on the yield of the PSA unit (from 75 to 90% depending on the desired efficiency).

This waste, with the $CO_2$ contained therein, is burnt in the steam reforming furnace. The waste gas from this unit is vented to atmosphere after recovering some of the available heat.

However, climate change constitutes one of the greatest environmental challenges. The increase in carbon dioxide concentration in the atmosphere is for a very large part the reason for global heating. In the context for reducing $CO_2$ emissions, capture of at least some of the $CO_2$ emitted must be envisaged.

It is known to remove $CO_2$ from such a fluid by scrubbing, for example scrubbing with amines, upstream of the PSA.

The drawback of such a solution is essentially its energy cost inappropriate to the capture problem.

Other solutions are based on adsorption.

Document EP 0 341 879 B1 treats the waste from an $H_2$ PSA in order to extract the $CO_2$ therefrom via a PSA and a refrigeration.

Document WO 2006/054008 also treats the waste from an $H_2$ PSA via a PSA and a cryogenic unit.

Document U.S. Pat. No. 5,026,406 describes the production of two high-purity fractions using a PSA. Example 2 partly corresponds to the problem posed here. A $CO_2$-rich (99.7 mol %) fraction and a fraction containing about 90 mol % 147 are obtained. In practice, this fraction has to be treated in a second unit, for example a PSA of the $H_2$ PSA type, in order to obtain an $H_2$ purity of 99%. It is necessary to use vacuum pumps and/or recycling in order to achieve the intended performance.

Document US 2007/0227353 also relates to the same technical problem. The recommended solution is again the use of a PVSA, i.e. an adsorption unit with vacuum steps. It is known that such steps, although they are efficient in terms of performance, are expensive in terms of capital investment (vacuum pumps) and in terms of energy.

Moreover, document FR 2 884 304 describes an adsorption unit operating at a maximum pressure of 10 bar absolute, producing a $CO_2$-enriched gas which is sent to a cryogenic unit that enriches this gas up to a minimum of 80 mol %. The $CO_2$-depeleted gas from the adsorption unit is expanded, after being cooled or not, in order to supply the refrigerating power of the cryogenic unit. At least one portion of the $CO_2$-lean gas from the cryogenic unit is recycled to the PSA, after being expanded or not. At least one portion of the $CO_2$-lean gas from the cryogenic unit is used as fuel. Said adsorption unit may be a VSA, a VPSA or a PSA.

The process and/or plant envisaged in document FR 2 884 304 comprises only a single adsorption unit.

That document essentially based on recovery of $CO_2$ in a fluid at a pressure below 10 bar abs does not relate to the associated production of hydrogen. In particular, it does not relate to SMR output gases.

The use of a PSA as described in FR 2 884 304 is not effectively suitable a priori when it is desired to extract $CO_2$ from a gas at a high pressure, such as syngas, whenever it is also desired to recover as a priority most of one of the least-adsorbable constituents. Specifically, since $CO_2$ is an easily adsorbable constituent, a moderate partial pressure, of the order of one bar, is sufficient for obtaining quasi-saturation of the adsorbents conventionally used, such as zeolites or active carbons. The use of a high pressure therefore provides nothing to the arresting of $CO_2$ but is unfavorable when it is desired to keep constituents, such as hydrogen, under pressure. Since the latter constituent is very weakly adsorbed, it is most particularly present in the adsorber in the gas phases, whether in the pore volume of the adsorbent, in the intergranular volume or in the in-out dead volumes. For a given volume, the loss of hydrogen is therefore proportional to the pressure. In such an application, it is normal to envisage instead to treat the waste from the $H_2$ PSA in order to sequester the $CO_2$ knowing that this is a low-pressure stream enriched in $CO_2$ and depleted in hydrogen. WO 2006/054008 and EP 0 341 879 B1 are based on these considerations.

One solution envisaged for partially obviating these drawbacks is, as mentioned, the use of a complex PSA cycle employing a vacuum to extract the $CO_2$. Under these conditions, the adsorbent may be used efficiently and the use of internal recycling then enables the loss of hydrogen to be limited. This pays for itself in terms of capital investment and energy consumption.

Starting from this situation, one problem that arises is how to provide a process capable of economically producing hydrogen with $CO_2$ capture and with no appreciable loss of hydrogen.

SUMMARY OF THE INVENTION

The present invention provides a process for the production of hydrogen from a gas mixture utilizing a $CO_2$ PSA, a cryogenic unit, and a $H_2$ PSA.

DETAILED DESCRIPTION OF THE INVENTION

Figure 1:
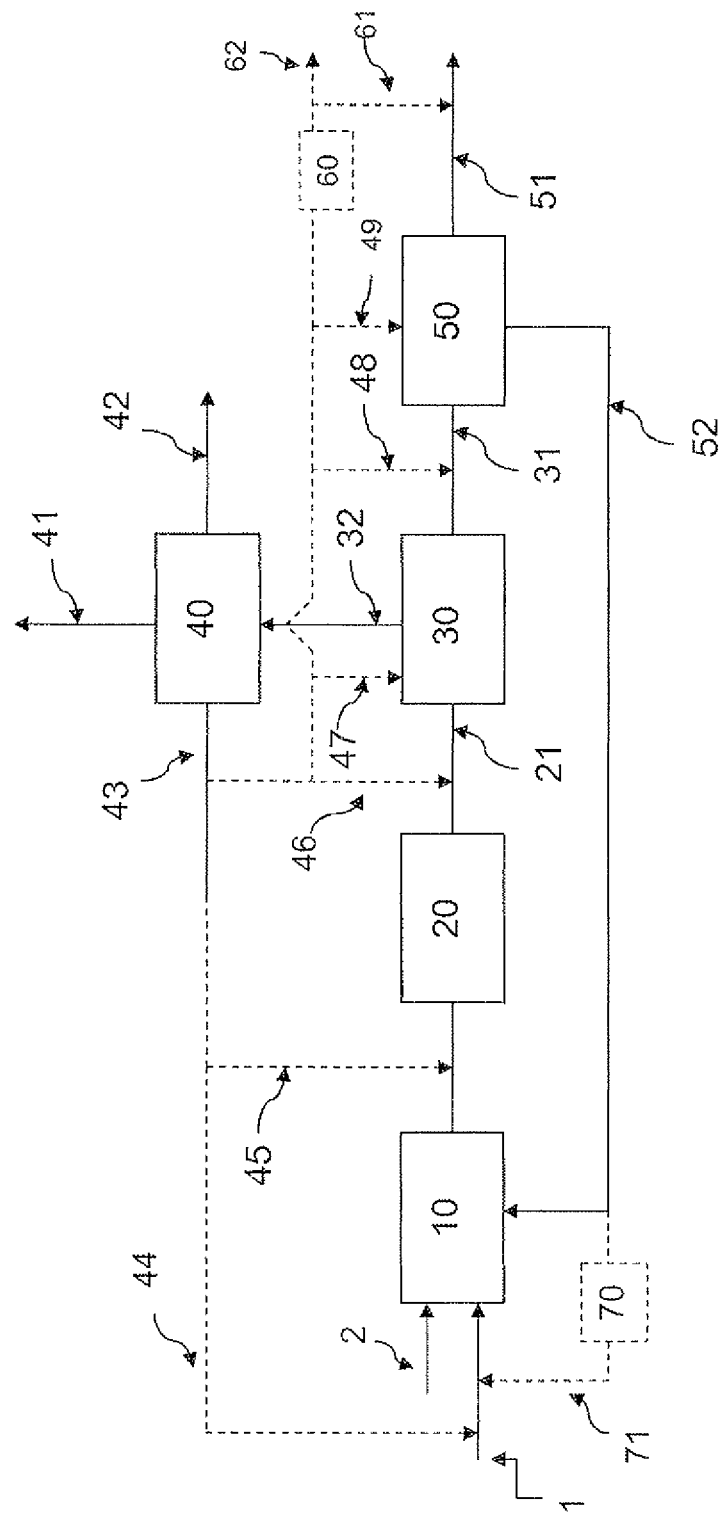
FIG. 1 illustrates a plant according to the present invention with various options for recycling the output by the cryogenic unit.

One solution of the invention is a process for the production of hydrogen from a gas mixture 21 comprising hydrogen ($H_2$), carbon dioxide ($CO_2$), carbon monoxide (CO), methane ($CH_4$) and water ($H_2O$), employing a $CO_2$ PSA unit 30, a cryogenic unit 40 and an $H_2$ PSA unit 50, in which:
a) said gas mixture 21 is introduced into a $CO_2$ PSA unit 30, producing a $CO_2$-enriched fraction 32 and a $CO_2$-depleted fraction 31;
b) the $CO_2$-rich fraction 32 is introduced into a cryogenic unit 40, producing a $CO_2$-enriched fraction 41 and an $H_2$-enriched fraction 43;
c) the $H_2$-enriched fraction 43 is recycled upstream of the $H_2$ PSA unit 50; and
d) the $CO_2$-depleted fraction 31 is introduced into the $H_2$ PSA unit 50, producing a hydrogen-enriched stream 51 and a waste gas 52.

Depending on the case, the process according to the invention may have one or more of the following features:
  the $H_2$-enriched fraction 43 represents more than 90% of the amount of hydrogen contained in the $CO_2$-rich fraction 32;
  between step a) and step b), the $CO_2$-enriched fraction 32 is compressed to a pressure above the pressure of the gas mixture 21;
  the $CO_2$ PSA 30 comprises at least one adsorber with at least one adsorbent and in that said adsorber is subjected to a pressure cycle that includes a step of purging the adsorbent with a portion of the compressed $CO_2$-enriched fraction 32;
  between step a) and step b), the $CO_2$-enriched fraction 32 is at least partially dried using a dryer 35;
  upstream of step a), the gas mixture 21 is at least partially dried using a dryer 25;
  upstream of step a), the gas mixture 21 is at least partially dried using a dryer 25 and in that the following substeps are carried out in step c): at least one portion of the H2-enriched fraction 43 is heated in a heater 44; said heated portion of the fraction 43 is used to regenerate the dryer 35 or the dryer 25; and then said portion of the fraction 43 is recycled upstream of the $H_2$ PSA unit 50, after refrigeration and separation of the condensed water;
  in step c), at least one portion of the $H_2$-enriched fraction 43 is recycled to upstream of the $CO_2$ PSA unit 30;
  the waste gas 52 is partially recycled upstream of the $H_2$ PSA 50;
  the $H_2$ PSA 50 is regenerated at a pressure equal to or below atmospheric pressure;
  the gas mixture 21 is a shifted reformed gas;
  the $CO_2$-enriched fraction 41 comprises more than 90% $CO_2$, preferably more than 97% $CO_2$, and even more preferably more than 99% $CO_2$;
  the $CO_2$-enriched fraction 41 is packaged in a bottle or tank or feeds a $CO_2$ line for industrial usage or for underground storage, or is produced in liquid form.

The subject of the invention is also a plant for the production of hydrogen from a gas mixture 21, comprising hydrogen $H_2$, carbon dioxide $CO_2$, carbon monoxide CO, methane $CH_4$ and water $H_2O$, characterized in that said plant comprises a $CO_2$ PSA 30 and an $H_2$ PSA 50 in series, the $CO_2$ PSA 30 being upstream of the $H_2$ PSA 50 and combined with a cryogenic unit 40.

Depending on the case, the plant may have at least one of the following features:
  the $CO_2$ PSA 30 comprises at least 5 adsorbers comprising at least silica gel as adsorbent;
  in each adsorber of the $CO_2$ PSA 30, the silica gel represents a minimum of 50% of the total adsorbent volume and a type A or type X zeolite, a maximum of 25% of the total volume;
  the cryogenic unit includes a device for stripping at least one portion of the $CO_2$ fraction 32, liquefied beforehand, so that the hydrogen, and in general the non-condensables, dissolved in this said fraction, are extracted therefrom.

The invention will now be described by means of FIGS. 1 and 2.

FIG. 1 shows a plant according to the invention with various options for recycling the streams output by the cryogenic unit.

Natural gas (or more generally hydrocarbons) 1 and steam 2 are introduced into the reforming unit 10. The reformed gas, comprising hydrogen ($H_2$), carbon dioxide ($CO_2$), carbon monoxide (CO), methane ($CH_4$), possibly argon (Ar) and nitrogen ($N_2$), and water ($H_2O$), is shifted in a shift reactor 20, in which at least some of the carbon monoxide reacts with at least some of the water to form hydrogen and carbon dioxide. The gas thus reformed and shifted corresponds to the gas mixture 21.

The gas mixture 21 feeds the $CO_2$ PSA 30. The fluid 32 is the $CO_2$-rich waste from the $CO_2$ PSA 30. This fluid is at low pressure, i.e. at a pressure below 3 bar abs, generally around atmospheric pressure. Since this fluid is compressed in order to feed the cryogenic unit 40, it could be at a slight underpressure (for example 0.9 bar abs) without departing from the teaching of the invention.

The cryogenic unit 40 serves, on the one hand, to deliver $CO_2$ (41) at the required purity for its use (sequestration, injection into gas or oil wells, chemistry, food processing, etc.) and, on the other hand, to recycle 43 most (more than 90%, preferably more than 95% and even more preferably more than 99%) of the hydrogen contained in the stream 32.

The cryogenic unit 40 may possibly produce a methane-enriched stream 42 that will be recycled into the unit 1 or used elsewhere.

The $H_2$-enriched fraction 43 may be recycled to various points in the unit 1:
  via the path 44 to upstream of the reforming unit; and/or
  via the path 45 to upstream of the shift; and/or
  via the path 46 to downstream of the shift and upstream of the $CO_2$ PSA 30; and/or
  via the path 47 directly to the $CO_2$ PSA 30; and/or
  via the path 48 to upstream of the $H_2$ PSA; and/or
  via the path 49 directly to the $H_2$ PSA 50.

Depending on the hydrogen specification—or if there are also requirements in terms of impure hydrogen—all or some of the hydrogen-enriched stream 43 may be either used at 62 in another unit or mixed at 61 with the main hydrogen production 51. A complementary treatment 60, for example permeation or catalysis (methanation, etc.), may be envisaged in order to adapt the purity of this stream to the requirements.

The streams 46 and/or 48 may be mixed with the main feed streams, 21 and 31 respectively, or constitute a second feed.

The streams 47 and/or 49 may be used internally to the PSA, for example to completely or partly purge or repressurize it. If this stream were to be injected into the PSA other than as main or secondary feed, at a pressure below the adsorption pressure, there is the possibility of inserting a permeation unit in order to hydrogen-enrich a portion of the stream.

The fraction 31, produced by the $CO_2$ PSA 30, is depleted in $CO_2$ and feeds the $H_2$ PSA 50. This produces an $H_2$-rich fraction 51 which constitutes the main production of the unit and a waste 52 which comprises the non-produced fraction of hydrogen, the residual $CO_2$ and most of the $CH_4$, CO, $N_2$ and Ar contained in the feed 31 to the $H_2$ PSA 50.

The waste 52 from the $H_2$ PSA may be completely recycled into the reformer 10, as fuel and/or as reactant 71 after being compressed in the compressor 70. A portion of this waste may also be recycled into the $H_2$ PSA itself, or else all or some of this stream may be used in an external unit. These variants, which in no way modify the spirit of the invention, are not shown in FIG. 1.

Indeed, in general, the process according to the invention uses a unit for capturing the $CO_2$ by PSA-adsorption, that is to say not involving a vacuum regeneration, coupled to a cryogenic unit which makes it possible both to obtain the required $CO_2$ purity and to recycle most of the hydrogen contained in the $CO_2$ fraction 32 output by the $CO_2$ PSA 30 into the reformed gas line. In other words, the hydrogen extracted from the $CO_2$ PSA is reinjected into the high-pressure circuit going from the SMR feed to the hydrogen production, that is to say at a pressure ranging from around fifteen bar absolute to a maximum of 40 bar absolute. The coupling to a cryogenic unit thus makes it possible to compensate for the moderate performance of the PSA (compared with a unit employing vacuum regeneration) thanks to more thorough purification of the $CO_2$ and improved recycling of the non-condensables. The term "non-condensable" is understood to mean $H_2$, $N_2$, $CH_4$, CO, Ar. It turns out that the modifications made to the cryogenic unit—in relation to a conventional $CO_2$ purification and production unit—such as the choice of a high operating pressure adapted to recycling, partial reboiling of the liquid $CO_2$ to expel the dissolved hydrogen therefrom and partial expansion of the liquid $CO_2$ to recover the vapor fraction rich in non-condensables, etc. entail a considerably lower cost than choosing a vacuum as driving force for regenerating the adsorption unit. It does not fall within the context of said invention to describe in detail the cryogenic units associated with the PSA for obtaining the required performance in respect of $CO_2$ capture and in respect of recycling the non-condensables, more particularly the hydrogen. It should be noted that the cryogenic unit will be fed at a pressure above the pressure of the hydrogen production, in practice always above 15 bar abs, and will preferably include what is called a "stripping" device, for stripping the hydrogen contained in the $CO_2$ and, more generally the nonncondensables: $N_2$, $CH_4$, CO and Ar, which device involves a lowering of the pressure and/or heating and/or injection of gas into a liquefied $CO_2$ fraction.

Figure 2:
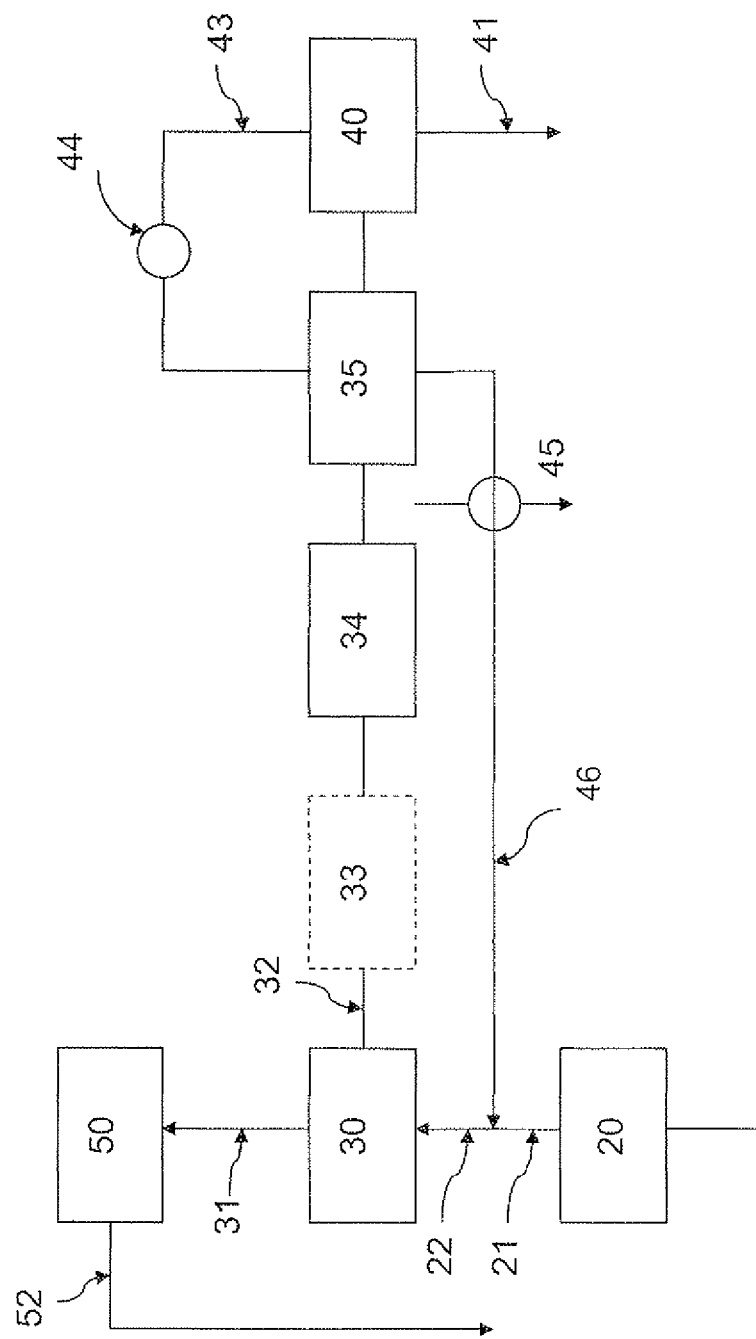
FIG. 2 illustrates a preferential plant with the present invention.

FIG. 2 corresponds to a preferential plant of the invention.

The $CO_2$-enriched fraction 32 feeding the cryogenic unit 40 will be compressed by the compressor 34 to a pressure above the pressure of the gas mixture 21 so as to be able to recycle the hydrogen-rich gas 43 without any other compression means. Since the $CO_2$-rich gas 32 output by the $CO_2$ PSA contains water vapor, this fluid will be at least partially dried before or after it is compressed and cooled (or on leaving an intermediate compression stage, after being cooled). The residual water content will be compatible with the proper operation of the cryogenic unit, the proper use of the materials adopted (corrosion) and the purity specification of the $CO_2$. For the sake of clarity, in FIG. 2 only the position after compression 34 has been shown for said desiccation 35. The regeneration of said drying unit may be carried out with a dried fraction of the fluid 32 or with an external fluid, such as nitrogen, or with the waste from the $H_2$ PSA 50, but preferably with all or part of the hydrogen-rich recycled fraction 43. To regenerate the desiccation unit 35, which preferably will be of the TSA (Temperature Swing Adsorption) type, the stream 43 may be cyclically heated in the exchanger 44 (electric heating, steam heating or heat recovery from a hot fluid) and cooled in the exchanger 45 with removal of the condensed water. This stream 46 is then reintroduced into the reformed gas.

The dryer may be of any type, but preferably of the TSA type as indicated above. The adsorbers may be of the cylindrical type with a vertical axis, of the cylindrical type with a horizontal axis or of the radial type for larger throughputs. The radial adsorber technology may be that used for overhead purification in front of cryogenic air separation units or that of $O_2$ VSA units.

The waste 32 from the $CO_2$ PSA may also feed a gasometer 33—or a buffer store—before being compressed at 34 and then dried at 35. This storage then has two effects, that of making the composition of the waste uniform and that of regulating its flow rate.

The shifted reformed gas 21 is mixed with the $H_2$-enriched gas 46 output from the cryogenic unit, which includes all the hydrogen contained in the $CO_2$-rich fraction (32), $CO_2$— depending on the thermodynamic equilibria reached in the cryo unit—methane, carbon monoxide and possibly nitrogen and argon. These contents depend essentially on the required purity of the $CO_2$.

The $CO_2$-depleted fraction 31 output from the $CO_2$ PSA unit 30 has a residual $CO_2$ content generally lying within the range from 0.5 to 7.5 mol %, even more generally from 1.5 to 3.5%.

The $H_2$ PSA 50 purifies said gas of $CO_2$, $CH_4$, CO, $N_2$, etc. and produces the pure hydrogen 51, i.e. with a purity of greater than 98% and generally between 99 and 99.9999%.

The low-pressure waste 52 from the $H_2$ PSA is generally used as fuel (in the SMR furnace) and/or as feedstock, after compression, for the SMR.

Since the feed gas for the $H_2$ PSA has been $CO_2$-deballasted, its hydrogen content may be equal to or exceed 85 mol %. It may therefore be economically advantageous to compress a portion of this waste so as to recycle it into the $H_2$ PSA, thus increasing the hydrogen production.

This recycling principle is described for example in documents U.S. Pat. Nos. 5,254,154 and 6,315,818.

As described above, this recycle may be mixed with the main feed (31) or may constitute a second feed.

It should be noted that since the waste 52 from the $H_2$ PSA is dry—the water having been removed in the $CO_2$ PSA—and depleted in $CO_2$—for the same reason—there is no particular problem in compressing this waste. Of course, this is not the case in the absence of the $CO_2$ PSA or there is a stream containing simultaneously water and $CO_2$ (corrosion problem).

Using the $CO_2$ PSA as means of drying the reformed gas before it is fed to the $H_2$ PSA is one of the advantages associated with this process. Since the waste 52 from the $H_2$ PSA is dry, it is conceivable, at reduced cost, to improve the performance of said PSA not only by recycling, as described above, but also by lowering the pressure of this waste. Indeed, in the case of a conventional $H_2$ PSA, the waste from the PSA is sent to the burners of the SMR furnace. The regulating means and the pressure drops in the pipes and accessories mean that the low pressure of the PSA cycle is around 1350 bar abs. Now, the performance of such a PSA is very sensitive to the low regeneration pressure. It has therefore been envisaged to counter-balance the various pressure drops in the circuit going to the burners by using a booster of the fan or roots type. The simultaneous presence of $CO_2$ and moisture means that either the maintenance or the use of special corrosion-resistant materials counter-balances the gains due to an increase in the hydrogen extraction yield. The fact of being able to use ordinary carbon steel considerably reduces the capital investment of such machines and may justify their use. Thus, the regeneration pressure of the $H_2$ PSA may be at atmospheric pressure, or even slightly below this pressure.

The cryogenic unit is a conventional unit, of the type with partial condensation as used for liquid $CO_2$ production for industrial or food-processing purposes. A first example is given in document EP 0341 879 B 1. A more complicated example is shown in FIG. 6 of document FR 2 884 304. Finally, document WO 2006/054008 describes variants of a cryogenic unit. Depending on the pressure and temperature levels used, the unit may include a device for extracting the hydrogen dissolved in the liquid $CO_2$ so as to make the losses negligible. This device may consist in partially reboiling the liquid $CO_2$, the light constituents then being preferentially in the gas phase. This cryogenic unit will therefore be characterized by its operating pressure equal to or greater than the pressure of the shifted gas, i.e. in practice always above 15 bar abs, and by hydrogen recycling of greater than 90%, preferably greater than 95%, more preferably still equal to or greater than 99%, of the hydrogen contained in the waste 32 from the $CO_2$ PSA.

The HP recycle 43 containing hydrogen is used to regenerate the dryer 35 after it has passed through the heater 44 in order to supply the energy to desorb the water. This fluid is then cooled at 45 for removal of the condensed water and for injection into the main stream 21. When combined with the cryogenic unit, the $CO_2$ PSA 30 may operate in a cycle of the $H_2$ PSA type.

Preferably, the $CO_2$ PSA 30 includes at least two pressure-balancing phases, more preferably 3 or 4 pressure-balancing phases, and is capable of producing a pressurized hydrogen-rich gas containing 0.5 to 7.5% $CO_2$, preferably 1.5 to 3.5 mol % $CO_2$, 0.5 to 7% CO, 3 to 10% $CH_4$ and 0 to 10% $N_2$. This gas is essentially dry, i.e. it contains on average less than 1 ppm water.

The waste gas 32 produced at low pressure is rich in $CO_2$ (80 to 95 mol %), the rest consisting of $H_2$, CO, $CH_4$, and possibly nitrogen. This gas also contains water vapor.

The overall degree of $CO_2$ extraction is in the range from approximately 70 to 98%, preferably around 85 to 90%.

Depending on the throughput treated, there will be 5 to 14 or more adsorbers. The phase times will generally be between 20 and 120 seconds depending on the number of adsorbers used. It will be recalled that the cycle time corresponds to the time T required to bring an adsorber back to a given state and that, for a cycle comprising N adsorbers, the phase time is by definition equal to T/N.

To give an example, a 10-3-4 cycle will be described, this being, using the conventionally accepted terminology, a PSA adsorption cycle employing 10 identical adsorbers each following a cycle comprising 3 production phases and 4 pressure-balancing phases. Such a cycle may be represented as in the table below:

| A | A | A | A |
|---|---|---|---|
| A | A | A | A |
| A | A | A | A |
| E1 | I | E2 | E2 |
| E3 | E3 | E4 | E4 |
| PP | PP | PP | PP |
| BD | BD | P | P |
| P | P | E'4 | E'4 |
| E'3 | E'3 | E'2 | E'2 |
| E'1 + R | R | R | R |

Such a table means that, on the one hand, a given adsorber will follow chronologically all the steps starting from the top-left box down to the bottom-right box and that, on the other hand, at a given moment, the 10 adsorbers are in a state corresponding to a column. A row corresponds to a phase as defined above. It may be seen that each phase comprises several steps that correspond to particular times in the control-and-command system (passing from one step to another generally implies at least one valve movement for the PSA). More particularly, the 10-3-4 cycle described here therefore comprises:

3 successive adsorption phases (A);
a phase comprising, in succession, a pressure-balancing step (E1), a dead time (I: isolated adsorber for example) and a second pressure-balancing step (E2);
a phase relating to the third and fourth pressure-balancing steps (E3 and E4);
a purge-providing phase (PP), i.e. producing a hydrogen-rich fraction and a light constituent (CO, $CH_4$, $N_2$) serving as elution gas for an adsorber then at low pressure;
a phase comprising the final countercurrent depressurization (blow-down), down to the low pressure, followed by purging steps (P);
a phase comprising the end of purging (P) and the start of repressurization via the fourth pressure-balancing step (E'4);
a phase with the third (E'3) and second (E'2) pressure-balancing steps; and
a tenth phase comprising the first pressure-balancing step (E'1) and the final repressurization.

It will be noted that once the waste 32 is recompressed, it is potentially possible to add a high-pressure or medium-pressure purging step to purge the adsorbent. Such a step—often called a rinse—is for example described in "Pressure Swing Adsorption" by Ruthven et al., 1994, page 69, table 3.1.

Such a step enables the adsorber to be partially purged of the hydrogen that it contains, enabling a waste richer in $CO_2$ to be obtained. Such a step is incorporated into the cycle during the depressurization and before the blow-down step. The improvement in performance thus obtained is to be compared with the greater complexity of the $CO_2$ PSA.

In the $CO_2$ PSA 30, it will be necessary to use adsorbents having a compromise between adsorption capacity and ease of desorption, since no vacuum is used for the end of desorption. More precisely, the use of type X or A zeolites, widely recommended for this application, will have to be proscribed or at the very least limited, preferably as final layer at the adsorber outlet, at the point where the $CO_2$ content is reduced. Preferably, this zeolite A or X layer will represent less than 25% of the total volume of adsorbent. One of the best adsorbents tested for this application is silica gel, for example the product manufactured by BASF under the reference LE 32. It may be applied in particular in combination with activated alumina (5 to 25% of the total volume of adsorbent) preferably placed upstream, with active carbon (5 to 20%). Certain molecular sieves (NaY, etc.) having a limited affinity with $CO_2$ may be used to optimize the performance in accordance with the $CO_2$ extraction objective adopted. Recently synthesized adsorbents, such as MOF (Metal Organic Frame) adsorbents, also correspond to the selection criteria.

The geometry of the adsorbers for the $CO_2$ PSA 30 may be of various types. Preferably cylindrical adsorbers having a vertical axis will be used for small throughputs, i.e. for feed flow rates up to a few thousand or tens of thousand $Nm^3/h$, and then cylindrical adsorbers having a horizontal axis or radial adsorbers for the largest throughputs. The radial adsorber technology may be that used for overhead purification in front of cryogenic air separation units or that of $O_2$ VSA units.

The $H_2$ PSA 50 is a conventional $H_2$ PSA with adsorbent distribution tailored to the feed composition. It may include a particular preprogrammed cycle in the event of a composition change, due for example to the $CO_2$ PSA being taken out of service. The principle of such additional cycles is described in document U.S. Pat. No. 7,255,727. As regards a priori a large-capacity $H_2$ PSA to be combined with $CO_2$ capture, cycles comprising several adsorbers, generally 8 or more, will be used. The hydrogen extraction yield may be around 90%, around 92% with a booster on the waste going to the burners, and around 92 to 95% with a recycle.

Figure 3:
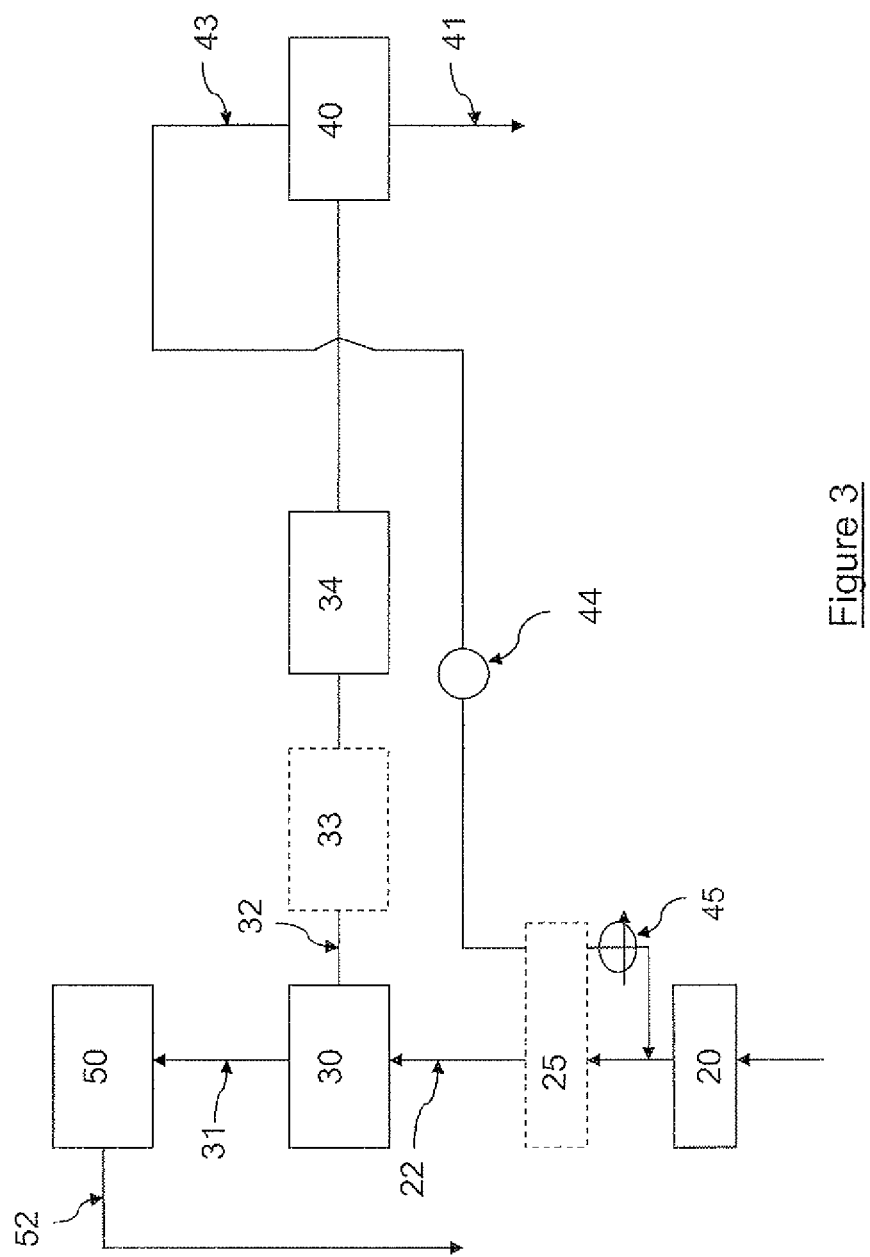
FIG. 3 illustrates an alternative embodiment of the present invention.

A variant, shown in FIG. 3, consists in drying the syngas in a unit 25 after the shift unit 20 and before the $CO_2$ PSA 30. This arrangement dispenses with the dryer 35. The advantage of such a unit 25 is that it allows standard materials to be used downstream, in particular in the $CO_2$ PSA and the compressor 34 (cf. FIG. 2).

Such a dryer 25 also prevents any water/$CO_2$ interference in the $CO_2$ PSA adsorbents and thus makes arresting the $CO_2$ easier. However, the unit 25 must treat the entire syngas flow. The choice of the basic solution or of said variant will depend on the operating conditions, on the local economic conditions, etc. This choice forms part of the optimization work carried out by a person skilled in the art. FIG. 3 shows the variant in which the desiccation 25 is of the TSA type and is regenerated under pressure by the stream 43 cyclically heated in the exchanger 44 (up to a temperature of around 100 to 250° C.) and then, after the water retained in 25 is desorbed, cooled in the exchanger 45 where the condensed water is removed. The resulting stream 46 is then reinjected upstream of the desiccation 25.

It will be noted that by placing the dryer in this position (25), it is obviously possible to retain the advantages of the drying carried out simultaneously with $CO_2$ arrest, which advantages were described above.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the production of hydrogen from a gas mixture (21) comprising hydrogen, carbon dioxide, carbon monoxide, methane and water, employing a carbon dioxide PSA unit (30), a cryogenic unit (40) and an hydrogen PSA unit (50), in which:

a) said gas mixture (21) is introduced into a carbon dioxide PSA unit (30), producing a carbon dioxide-enriched fraction (32) and a carbon dioxide-depleted fraction (31);
   b) the carbon dioxide enriched fraction (32) is introduced into a cryogenic unit (40), producing a carbon dioxide-enriched fraction (41) and a hydrogen-enriched fraction (43);
   c) the hydrogen-enriched fraction (43) is recycled upstream of the hydrogen PSA unit (50); and
   d) the carbon dioxide-depleted fraction (31) is introduced into the hydrogen PSA unit (50), producing a hydrogen-enriched stream (51) and a waste gas (52), wherein the waste gas (52) is recycled upstream of the carbon dioxide PSA unit (30).

2. The process of claim 1, wherein the hydrogen-enriched fraction (43) represents more than 90% of the amount of hydrogen contained in the carbon dioxide enriched fraction (32).

3. The process of claim 1, wherein between step a) and step b), the carbon dioxide-enriched fraction (32) is compressed to a pressure above the pressure of the gas mixture (21).

4. The process of claim 3, wherein the carbon dioxide PSA (30) comprises at least one adsorber with at least one adsorbent and in that said adsorber is subjected to a pressure cycle that includes a step of purging the adsorbent with a portion of the compressed carbon dioxide-enriched fraction (32).

5. The process of claim 1, wherein between step a) and step b), the carbon dioxide-enriched fraction (32) is at least partially dried using a dryer (35).

6. The process of claim 1, wherein upstream of step a), the gas mixture (21) is at least partially dried using a dryer (25).

7. The process of claim 5, wherein upstream of step a), the gas mixture (21) is at least partially dried using a dryer (25) and in that the following substeps are carried out in step c):

at least one portion of the hydrogen-enriched fraction (43) is heated in a heater (44);
   said heated portion of the fraction (43) is used to regenerate the dryer (35) or the dryer (25); and then
   said portion of the fraction (43) is recycled upstream of the hydrogen PSA unit (50).

8. The process of claim 1, wherein in step c), at least one portion of the hydrogen-enriched fraction (43) is recycled to upstream of the carbon dioxide PSA unit (30).

9. The process of claim 1, wherein the hydrogen PSA (50) is regenerated at a pressure equal to or below atmospheric pressure.

10. The process of claim 1, wherein the gas mixture (21) is a shifted reformed gas.

11. The process of claim 1, wherein the carbon dioxide-enriched fraction (41) comprises more than 90% carbon dioxide.

12. The process of claim 11, wherein the carbon dioxide-enriched fraction (41) is packaged in a bottle or a mobile tank or feeds a carbon dioxide line for industrial usage or for underground storage, or is produced in liquid form.

13. The process of claim 7, wherein the carbon dioxide-enriched fraction (41) comprises more than 97% carbon dioxide

* * * * *